Aug. 31, 1965  N. PELICK  3,203,021
APPLICATOR FOR THIN LAYER CHROMATOGRAPHY
Filed Sept. 20, 1963
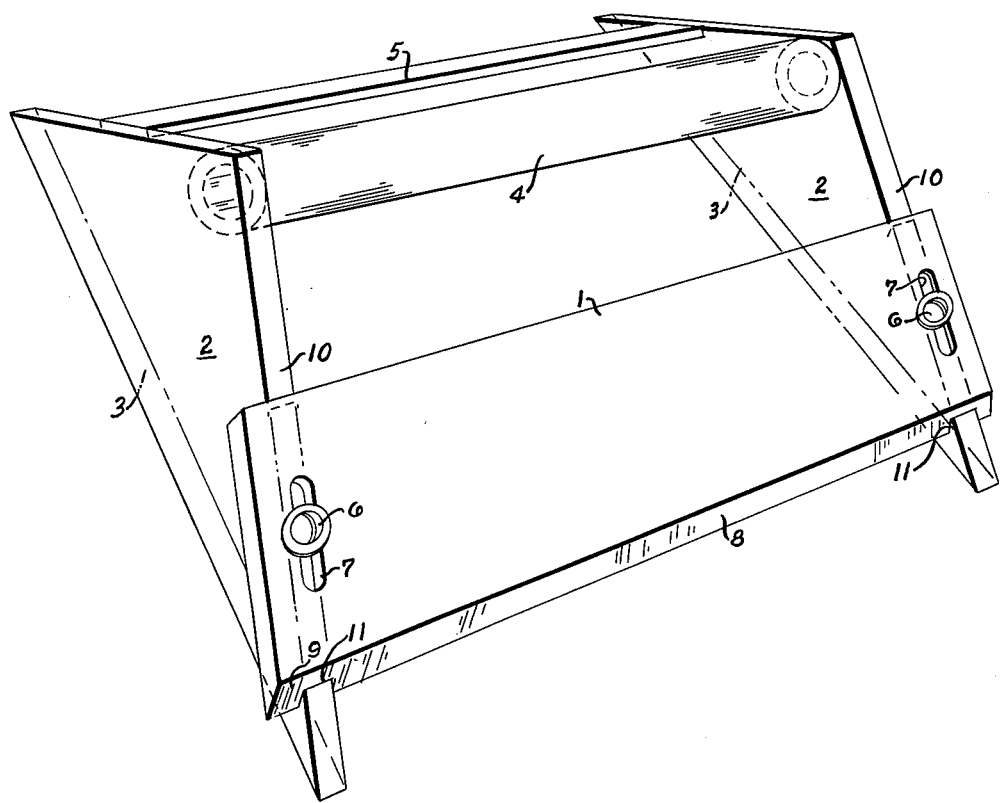
INVENTOR
Nicholas Pelick 3,203,021
APPLICATOR FOR THIN LAYER CHROMATOGRAPHY
Nicholas Pelick, State College, Pa., assignor to Applied Science Laboratories, Inc., State College, Pa.
Filed Sept. 20, 1963, Ser. No. 310,315
6 Claims. (Cl. 15—236)

My invention is an improved device and procedure for making the thin layers of silica gel, alumina, or other substances that are necessary in order to perform thin layer chromatography. Thin layer chromatography is a method of separating complex and simple mixtures that may be difficult or impossible to separate and analyze by other means. The method is similar to paper chromatography, except that the paper is replaced by a thin layer of finely divided silica gel, alumina or other powder, spread upon and supported by a glass plate or similar surface. It is of course necessary to be able to prepare satisfactory thin layers on plates by a convenient simple method. The degree of success of the separations done with the thin layers is reduced if they are not reasonably uniform in thickness.

The general way of preparing a thin layer is to place a water slurry of adsorbent powder upon a glass plate and then spread this slurry with some kind of a ruler or straight edge. The latter must be supported so that it does not scrape the glass completely clean of slurry but instead leaves the desired thin layer of slurry upon the glass surface. This wet layer is allowed to dry to form the required thin layer. Practice, skill and precision in motion are necessary to achieve a uniform thin film with a ruler or other straight edge, unless some kind of mechanical support is used. Several kinds of mechanical devices have been used but all of these are relatively complicated to make and use compared with my invention. These other devices have one or more of the following disadvantages: they are difficult to manipulate in a manner that will cause the working edge of the spreader blade to move in a plane that is parallel to the glass surface that is to be coated; they give layers with undue or erratic variation in thickness; they have no adjustment for obtaining layers of different thickness when these are desired; they do not allow movement of the blade in the reverse of the original direction or do not permit a second passage of the scraper blade over a given section of thin layer which might be imperfect dut to an air bubble in the slurry, or imperfect for other reasons; they require preparation of one thin layer plate at a time; are subject to corrosion; lack the advantage of a replaceable scraper blade.

The general objective of my invention is to make a relatively simple device that minimizes or eliminates all the difficulties and disadvantages mentioned above, so that the said device can quickly and reliably produce thin layers of necessary uniformity without the need for extensive practice, skill and judgment.

A specific objective of my invention is to eliminate thin layer irregularities that arise as the scraper device approaches the end of the glass plate, or as the device passes irregularities in the surface of the glass. Another specific objective of my invention is to make it easily possible to reverse the spreader motion so as to come forward a second or additional time over the same area and thus easily and quickly remove imperfections in the thin layer first produced. A still further specific objective is to make it possible to produce easily layers of different thickness as desired. Another objective is to avoid irregularities and difficulties that are caused by corrosion of the device due to the chemical nature of the components of the power in the slurry. Still another objective is to make it easily possible to replace the scraper blade when it becomes worn from use, or otherwise imperfect. Along with all these specific objectives it is a general objective to achieve simplicity of construction and use, and low cost and efficiency of use. Other objectives will be clear from the detailed description of the device and its use.

The construction and use of the device of my invention are best made clear by examination of the accompanying figure of the device.

It will be noted that the general nature of the device is that of a scraper blade 1 supported by two triangular side pieces 2 whose bases 3 constitute the surface on which the entire device rests. The upper portions of the triangular pieces support a rod 4 that serves as a handle in manipulating the device. There is also a further supporting member 5 that joins the two triangular pieces in order to achieve overall rigidity. It is also to be noted that the scraper blade 1 is fastened to the upper edges 10 of the triangular side pieces by screws 6 that pass through elongated holes 7 in the scraper so that the screws can be loosened to permit some adjustment of the position of the scraper blade. The lower edge of the scraper blade is preferably beveled as indicated at 9 to produce a knife edge 8 for doing the actual scraping and smoothing of the slurry. It will be further noted that the supporting member 5 that supplies rigidity is so placed as to have its lower edge at a level well above the level of the lower edge 8 of the scraper blade when the entire device is standing on its triangular bases. It is to be noted that the device described is made entirely of a plastic (except for the adjusting screws), but that metal or glass could be used for construction, if desired. Finally it is to be particularly noted that the triangle edges that serve as the base of the device are long enough to stabilize the device so that no skill or practice or judgment is required to move the spreader device along a flat surface in such a manner that the working edge 8 of the spreader blade moves in a plane parallel to the supporting surface. Also it is to be noted that the grooves 11 in the blade which engage the top surfaces or upper edges 10 maintain the knife edge 8 parallel with the plane of the supporting surface.

The preferred method of applying a layer of slurry to glass plates is as follows. Two to five plates about 8 by 8 inches are laid in a row, with the edges in alignment on a flat table top or similar surface. The glass plates should be just a little narrower than the distance across the spreader blade so that the spreader device rests on the flat table, and does not rest on the glass plates that are to be coated. The normal procedure is to place the applicator over the first plate (the one to the left) with the blade to the left. Pour a portion of the slurry on the first plate just to the right of the blade, and also pour an approximately equal portion of slurry across the plates at each place where the plates meet. Then, immediately draw the applicator over the plates from left to right. This operation should be rapid (1 second per plate), but not hurried to the extent that the operation is not smooth. The plates are allowed to air-dry in a location free of fumes and vapors. They may be picked up and the edges cleaned. All the plates except the first should be usable. Good results may be obtained in analyses with films as thin as 0.2 mm. and as thick as 0.5 mm., but on any one plate or in any one series of plates the film thickness should not vary by more than 0.1 mm. On any one plate there should not be erratic changes in thickness.

The scraper blade that controls thickness is adjusted by placing the spreader in position over one of the glass plates which are to be coated, and then loosening the screws 6 on the sliding blade 1 and allowing the grooves 11 of the blade to slide on the upper surface 10 and come to rest on a spacer that is lying on the glass plate. The spacer will determine the thickness of the layer. The spacer may be a convenient piece of sheet metal (about 32 gauge for 0.25 mm.), feeler gauges, or even a piece of heavy paper. It is important that the space between the blade is uniform across the blade. The screws 6 are then tightened, and the spacing may be checked by slipping the spacer in and out at various places.

It is also possible to use the spreader with glass plates that are wider than the spreader. In this case the bases 3 of the spreader rest on and move on the glass plates. The position of the spreader blade must be adjusted accordingly, and the lower corners of the triangular side pieces must be somewhat rounded.

When necessary or desirable the entire scraper blade can be disassembled from the side pieces by removing the screws. The scraper blade edge can be straightened or sharpened, and the blade reassembled, or a new blade can be mounted on the unit.

The exact dimensions and relative positions of the parts are those that have been found preferable for a wide range of laboratory uses. These are: distance between the two triangular side pieces, 9 inches; length of scraper blade, 10 inches. The triangular side pieces are isosceles triangles with a base 9⅝ inches long, sides 5⅝ inches long, and the angle of the sides with the base 30°. However, it will be understood that larger or smaller dimensions and somewhat different relative positions of the parts may be used without losing the effectiveness and advantages of the device. While the invention has been described in a certain preferred embodiment it is realized that modifications can be made without departing from the spirit of the invention, and it is to be understood that no limitations upon the invention are intended other than those imposed by the scope of the appended claims.

What I claim is:

1. A spreading device for use in thin layer chromatography for spreading a thin layer of uniform thickness on plates comprising in combination, a pair of side support members of substantial length disposed in spaced relation, base surfaces of substantial length on said side support members in the same plane adapted for engaging a flat surface, a handle member connected at opposite ends between said pair of side support members to rigidly connect said side support members in spaced relation, said handle member connected a substantial distance above said base surfaces and generally centrally of the length thereof, downwardly sloping parallel upper edges on said pair of side support members, a scraper blade member movably attached to said downwardly sloping parallel upper edges of opposite side support members, a knife edge extending along the lower edge of said scraper blade member, means for keeping parallel to the plane of said base surfaces said knife edge, whereby said device may be longitudinally moved in either direction by said handle member to spread a thin layer of uniform thickness upon plates positioned on the flat surface between said pair of side support members with said knife edge which layer is independent of imperfections on the surface of the plates.

2. A spreading device as set forth in claim 1 including adjustable threaded screw means connected on said downwardly sloping upper edges adjustably connecting said scraper blade members to said downwardly sloping upper edges whereby said scraper blade member may be elevated or lowered relative to the plane of said base surfaces.

3. A spreading device as set forth in claim 1 including a cross support member connected between said pair of side support members a substantial distance above said base surfaces and on the opposite side of said handle member from said scraper blade member.

4. A spreading device as set forth in claim 1 in which said scraper blade member is angularly disposed at the same angle as said downwardly sloping upper edges.

5. A spreading device as set forth in claim 1 said last-named means comprising an elongated bottom surface on said scraper blade with parallel grooves in opposite ends thereof respectively slidably engaging said downwardly sloping upper edges.

6. A spreading device as set forth in claim 1 in which said side support members are triangular in shape.

References Cited by the Examiner
UNITED STATES PATENTS

| 410,898 | 9/89 | Kattentidt | 118—413 X |
| 417,202 | 12/89 | Reichenbach | 117—34 X |
| 1,858,308 | 5/32 | Schiller | 15—236 X |
| 2,497,578 | 2/50 | Bradley | 15—236 |
| 2,727,266 | 12/55 | Smith et al. | 15—236 |
| 3,145,410 | 8/64 | Stahl | 15—510 |

CHARLES A. WILLMUTH, *Primary Examiner.*

WALTER A. SCHEEL, *Examiner.*